(12) United States Patent
Kim et al.

(10) Patent No.: US 9,020,186 B2
(45) Date of Patent: Apr. 28, 2015

(54) METHOD AND APPARATUS FOR DETECTING OBJECT USING VOLUMETRIC FEATURE VECTOR AND 3D HAAR-LIKE FILTERS

(75) Inventors: Dai-Jin Kim, Gyeongbuk (KR); Dae-Hwan Kim, Gyeongbuk (KR); Yeon-Ho Kim, Incheon (KR); Hyun-Jin An, Gyeongbuk (KR)

(73) Assignee: Postech Academy—Industry Foundation, Gyeongbuk (KR)

( * ) Notice: Subject to any disclaimer, the term of this patent is extended or adjusted under 35 U.S.C. 154(b) by 452 days.

(21) Appl. No.: 13/407,487

(22) Filed: Feb. 28, 2012

(65) Prior Publication Data

US 2013/0004018 A1 Jan. 3, 2013

(30) Foreign Application Priority Data

Jun. 29, 2011 (KR) .......................... 10-2011-0064089

(51) Int. Cl.
*G06K 9/00* (2006.01)
(52) U.S. Cl.
CPC ........ *G06K 9/00375* (2013.01); *G06K 9/00201* (2013.01)

(58) Field of Classification Search
None
See application file for complete search history.

(56) References Cited

U.S. PATENT DOCUMENTS

| 8,675,952 | B2 * | 3/2014 | Hwang et al. ................. | 382/154 |
| 2002/0118872 | A1 * | 8/2002 | Horn et al. ................... | 382/137 |
| 2009/0074280 | A1 * | 3/2009 | Lu et al. ....................... | 382/131 |

* cited by examiner

*Primary Examiner* — Nancy Bitar
(74) *Attorney, Agent, or Firm* — Osha • Liang LLP

(57) ABSTRACT

In a method of detecting a specific object using a multi-dimensional image including the specific object, with respect to each window slide of the image subjected to window sliding by applying a previously generated 3D cube filter, data of an area corresponding to the window sliding is normalized in a previously defined specific form. After the corresponding part of the normalized data is assigned to each cell in the 3D cube filter, a volume of the cell is then calculated, thereby expressing the volumes of the cells as one volumetric feature vector having a volumetric feature. The volumetric feature vector is applied to a classifier so as to decide whether or not the data of the area corresponding to the window slide corresponds to the specific object.

14 Claims, 9 Drawing Sheets

METHOD AND APPARATUS FOR DETECTING OBJECT USING VOLUMETRIC FEATURE VECTOR AND 3D HAAR-LIKE FILTERS

CLAIM FOR PRIORITY

This application claims priority to Korean Patent Application No. 10-2011-0064089 filed on Jun. 29, 2011 in the Korean Intellectual Property Office (KIPO), the entire contents of which are hereby incorporated by reference.

BACKGROUND

1. Technical Field

Example embodiments of the present invention relate in general to a method and apparatus for detecting an object in an image, and more specifically to a method and apparatus for detecting an object using a volumetric feature vector and 3D Haar-like filters.

2. Related Art

An interface using vision-based hand gestures has come into the spotlight as a natural and human-friendly interface in a virtual space. Since hand gesture recognition can provide a variety of information through hand gestures having fast communication features and implicative meanings, active research is recently being conducted on the hand gesture recognition.

However, it is still difficult to search for a hand and recognize a hand gesture in a complex background. Particularly, the hand should be exactly detected more than anything else so as to recognize the hand gesture. The more exactly a hand area is detected, the more exactly a hand gesture is recognized. Therefore, research has been conducted to develop methods of readily detecting a hand area even in a complex background.

However, such hand detection techniques do not show high detection performance due to the deficiency of unique features of a hand. This becomes a primary factor that causes the hand detection techniques not to be practically applied to various systems in spite of excellent applicability of the hand detection techniques.

The existing hand detection techniques are performed using skin color or 2D appearance information, but do not show robust detection performance due to a change in environment, a change in illumination or a change in pose of a hand. A variety of objects similar to the skin color of a hand exist in actual environment, and a sudden change in illumination causes a change in value of an actual skin color. The hand is a non-rigid body having five fingers, and hence generates various changes in its pose.

SUMMARY

Accordingly, example embodiments of the present invention are provided to substantially obviate one or more problems due to limitations and disadvantages of the related art.

Example embodiments of the present invention provide a method of detecting an object, which can obtain robust detection performance.

Example embodiments of the present invention also provide an apparatus for detecting an object, which can obtain robust detection performance.

In some example embodiments, a method of detecting a specific object using a multi-dimensional image including the specific object includes: with respect to each window slide of the image subjected to window sliding by applying a previously generated 3D cube filter, normalizing data of an area corresponding to the window sliding in a previously defined specific form; assigning a corresponding part of the normalized data to each cell in the 3D cube filter and then calculating a volume of each of the cells, thereby expressing the volumes of the cells as one volumetric feature vector having a volumetric feature; and applying the volumetric feature vector to a classifier so as to decide whether or not the data of the area corresponding to the window slide corresponds to the specific object.

Here, the image may be a 3D image obtained using a 3D camera, and the specific object may be a hand.

Here, the data of the area corresponding to the window slide may be 3D data, and the 3D data may be normalized using 3D connected components and axis rotational movement using a Y-axis as a principal axis.

Here, expressing the volumes of the cells as the volumetric feature vector may include: assigning the corresponding part of the normalized data to each of the cells in the 3D cube filter and then projecting the part of the data corresponding to the cell onto an X-Y plane, thereby generating a binary image; dividing the binary image of each of the cells into a plurality of split leaf nodes, thereby calculating a volume of the cell; and expressing the calculated volumes of the cells as the one volumetric feature vector.

Here, the binary image may be generated using a dilation operation so as to fill empty spaces of the projected parts of the data.

Here, the binary image may be divided into a plurality of split leaf nodes using a quad tree algorithm.

Here, the classifier may be a classifier generated using the volumetric feature based on the 3D cube filter and Haar-like filters.

Here, applying the volumetric feature vector to the classifier may include: obtaining a first classification result by applying the volumetric feature vector to a first classifier; and obtaining a second classification result by applying the first classification result to a second classifier, wherein the first classifier may be a classifier trained with the specific object and a first object, the second classifier may be a classifier trained with the specific object, the first object and a second object, and the first and second objects may be different objects determined from objects except the specific object.

In other example embodiments, a training method for detecting a specific object using a multi-dimensional image including the specific object includes: extracting data of an area including the specific object from data of the multi-dimensional image and primarily normalizing the extracted data in a previously defined specific form; generating a 3D cube filter, assigning a corresponding part of the normalized data to each cell in the 3D cube filter and then calculating a volume of each of the cells, thereby expressing the volumes of the cells as a first volumetric feature vector; and generating a plurality of 3D Haar-like filters by combining the first volumetric feature vector and Haar-like filters.

Here, the multi-dimensional image may further include an object except the specific object, and the training method may further include extracting data of an area including an object except the specific object and secondarily normalizing the extracted data in a previously defined specific form; assigning a corresponding part of the secondarily normalized data to each of the cells in the 3D cube filter and then calculating a volume of the cell, thereby expressing the volumes of the cells as a second volumetric feature vector; and generating a plurality of 3D Haar-like filters by combining the second volumetric feature vector and Haar-like filters.

Here, the multi-functional image may be a 3D image, the data of an area including an object except the specific object data and the data of an area including the specific object may be 3D data, and the 3D data may be normalized using 3D connected components and axis rotational movement using a Y-axis as a principal axis.

Here, after the corresponding part of the normalized data is assigned to each of the cells in the 3D cube filter, a binary image may be generated by projecting the part of the data corresponding to the cell onto an X-Y plane, the volume of the cell may be calculated by dividing the binary image of the cell into a plurality of split leaf nodes, and then the first or second volumetric feature vector may be expressed using the volumes of the cells.

Here, the training method may further include extracting a 3D Haar-like filter satisfying a predetermined confidence value from the plurality of 3D Haar-like filters using a predetermined training algorithm.

Here, the predetermined training algorithm may be an Adaboost algorithm, and the specific object may be a hand.

In other example embodiments, a training apparatus for detecting a specific object using a multi-dimensional image including the specific object includes: a data normalization unit configured to extract data of an area including the specific object from data of the 3D image and normalize the extracted data in a previously defined specific form; a volume calculation unit configured to generate a 3D cube filter, assign a corresponding part of the normalized data to each cell in the 3D cube filter, and then calculate a volume of each of the cells; a volumetric feature vectorization unit configured to express the calculated volumes of the cells as one volumetric feature vector; and a 3D Haar-like filter generation unit configured to generate a plurality of 3D Haar-like filters by combining the volumetric feature vector and Haar-like filters.

Here, the data normalization unit may further extract data of an area including an object except the specific object from data of the 3D image, and normalize the extracted data in a previously defined specific form.

Here, after the corresponding part of the normalized data is assigned to each of the cells in the 3D cube filter, a binary image may be generated by projecting the part of the data corresponding to the cell onto an X-Y plane, the volume of the cell may be calculated by dividing the binary image of the cell into a plurality of split leaf nodes, and then the volumetric feature vector may be expressed using the volumes of the cells.

Here, the training apparatus may further include an optimal filter extraction unit configured to extract a 3D Haar-like filter satisfying a predetermined confidence value from the plurality of 3D Haar-like filters using an Adaboost algorithm.

BRIEF DESCRIPTION OF DRAWINGS

Example embodiments of the present invention will become more apparent by describing in detail example embodiments of the present invention with reference to the accompanying drawings, in which:

FIG. 2(2) is a conceptual diagram illustrating a section of a slice including a central cell of the 3D cube filter according to the example embodiment of the present invention;

DESCRIPTION OF EXAMPLE EMBODIMENTS

Figure 1:
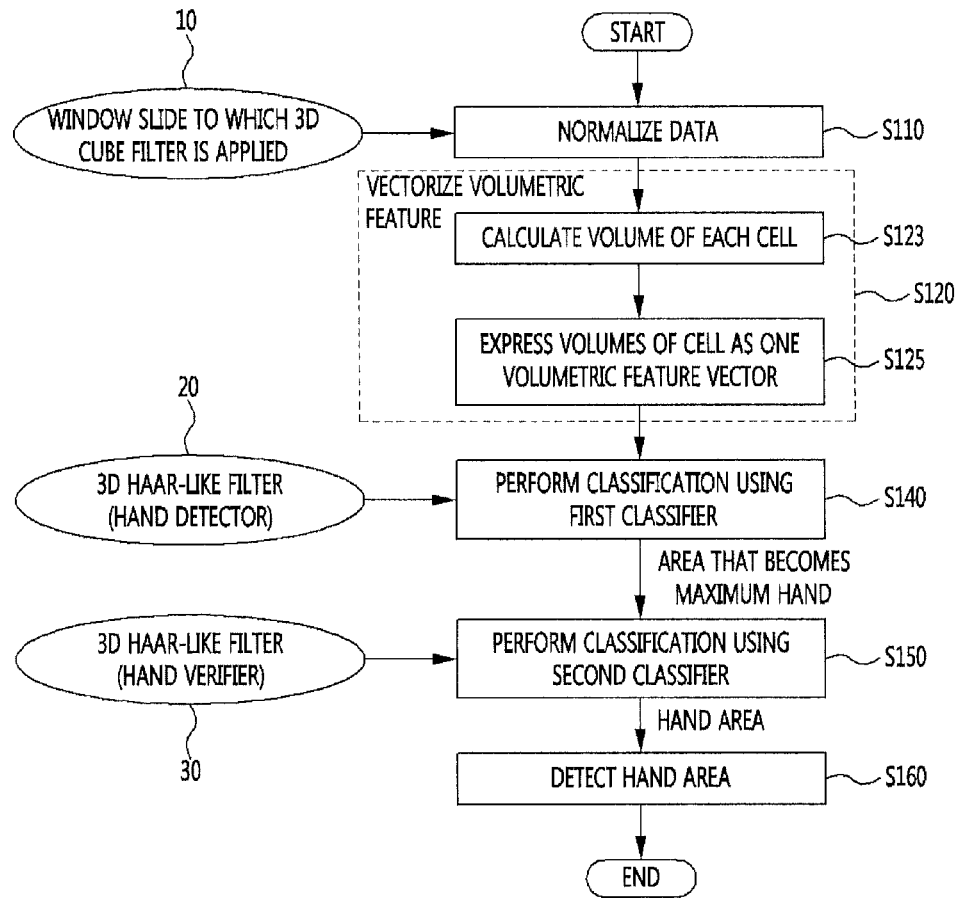
FIG. 1 is a sequence chart illustrating steps in a process of detecting an object in an image according to an example embodiment of the present invention.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Hereinafter, an apparatus and method for detecting an object in an image according to example embodiments of the present invention will be described. More specifically, a method and apparatus for detecting a hand in a 3D image will be described.

Object recognition is first performed so as to detect a specific object in an image. The object recognition refers to an operation of detecting a desired object in an image based on previously trained data. The object recognition is generally divided into a training data extraction process and an object recognition process using trained data.

The training data extraction process refers to a process of extracting information (e.g., difference in brightness with surroundings, distribution of boundary values, etc.) which can represent an object to be recognized, i.e., a feature vector, from positive data of the object and training the feature vector.

The object recognition refers to a process of detecting an object using trained data. While human eyes can easily classify objects with various sizes into various kinds, it is not easy for a computer to classify objects with various sizes into the same kind.

Therefore, a sliding window method is used to detect an object with various sizes. The sliding window method refers to a method of recognizing and detecting an object by scanning an input image using a window with a predetermined size.

Hereinafter, a method of detecting an object in a 3D image, a training method for detecting an object in a 3D image and an apparatus for detecting an object in a 3D image according to an example embodiment of the present invention will be sequentially described.

First, steps in the method of detecting an object in a 3D image according to an example embodiment of the present invention will be schematically described, and then, the steps in the method will be then described in detail using expressions.

Method of Detecting Object in 3D Image

FIG. 1 is a sequence chart illustrating steps in a process of detecting an object in an image according to an example embodiment of the present invention.

Referring to FIG. 1, the process of detecting an object in an image according to the example embodiment of the present invention includes a data normalization step (S110), a volumetric feature vectorization step (S120), a first classification step (S140), a second classification step (S150) and a hand area detection step (S160).

The steps in the process of detecting an object in an image according to the example embodiment of the present invention will be described below with reference to FIG. 1.

A hand will be described as a specific object to be detected.

Meanwhile, the following steps are performed on each window slide in a 3D image subjected to window sliding by applying a previously generated 3D cube filter.

The data normalization step (S110) is a step of normalizing data in an area corresponding to an obtained window slide into a previously defined specific form. The normalization of 3D data uses 3D connected components and axis rotational movement using the Y-axis as a principal axis. The normalization of data will be described in detail later.

The volumetric feature vectorization step (S120) includes a step (S123) of calculating a volume of each cell of each 3D cube filter and a volumetric feature vector expression step (S125).

The step (S123) of calculating a volume of each cell is a step of assigning each cell of a 3D cube to an area corresponding to a window slide by applying a 3D cube filter to the window slide, and calculating a volume of the cell.

The 3D cube filter may consist of 3×3×3 cells, i.e., a total of 27 cells. The data area corresponding to a window slide is assigned to each of the cells by respectively mapping the 27 cells to window slides, and the volume of each of the cells of the 3D cube filter having data assigned thereto is calculated.

In the volumetric feature vector expression step (S125), one volumetric feature vector having a volumetric feature is expressed using the volumes of the cells.

For example, in order to calculate the volume of each of the cells, a binary image may be generated by projecting a part of data assigned to each of the cells onto an X-Y plane. The binary image may be generated using a dilation operation so as to fill empty spaces of the projected parts of data. Then, the volume of each of the cells may be generated by dividing the binary image of each of the cells into a plurality of split leaf nodes using a quad tree algorithm. Subsequently, the volumetric feature vector is expressed using the volumes of the cells. The expression of the volumetric feature vector will be described in detail later.

The first classification step (S140) and the second classification step (S150) are steps of applying the volumetric feature vector to a classifier so as to decide whether or not data in the area corresponding to the window slide corresponds to the specific object to be detected.

In the classification step, both the first classification step (S140) and the second classification step (S150) may be sequentially performed, or any one of the first classification step (S140) and the second classification step (S150) may be performed.

FIG. 1 illustrates an example of sequentially performing the two steps so as to detect a hand.

The first classification step (S140) is a step of obtaining a first classification result by applying the volumetric feature vector to a first classifier, and the second classification step (S150) is a step of obtaining a second classification result by applying the first classification result to a second classifier. The second classification result may indicate how similar to the hand the data of the corresponding window slide is.

Here, the first classifier may be a classifier trained with a hand and an object (e.g., a wrist) except the hand, and the second classifier may be a classifier trained with a hand, a writ and an elbow. The object included in data used in training may be changed depending on an object to be detected, and is not particularly limited. The two-step detection method will be described in detail later.

Meanwhile, the classifier according to the embodiment of the present invention may use a volumetric feature vector based on the 3D cube filter and a 3D Haar-like filter generated using a Haar-like filter. The 3D Haar-like filter will be described in detail later.

The hand area detection step (S160) is a step of performing a step for detecting a hand area in all areas of a 3D image and then finally detecting, as the hand area, an area having data closest to the feature of a hand.

The above-described process of detecting a specific object in an image will be described in further detail below using expressions.

1) Generation of 3D Cube Filter

Figure 2:
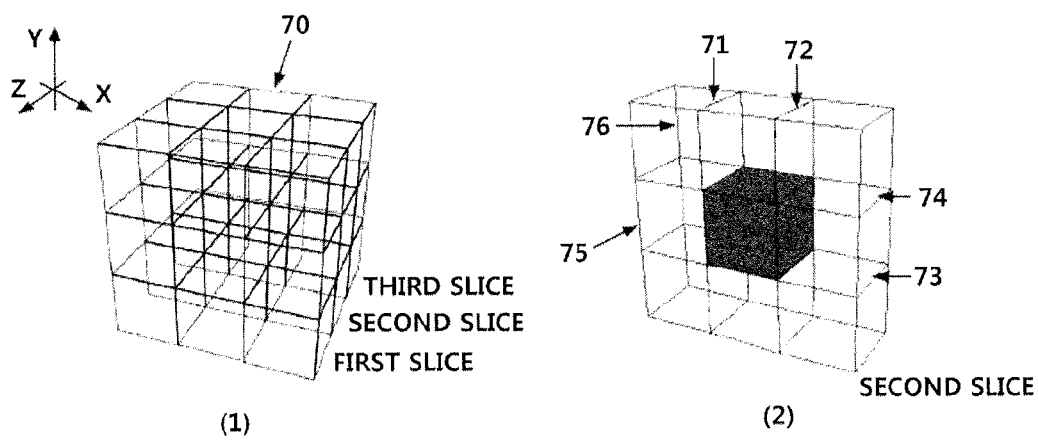
FIG. 2(1) is a conceptual diagram illustrating a 3D cube filter according to an example embodiment of the present invention.

FIG. 2(1) is a conceptual diagram illustrating a 3D cube filter according to an example embodiment of the present invention. FIG. 2(2) is a conceptual diagram illustrating a section of a slice including a central cell of the 3D cube filter according to the example embodiment of the present invention.

Referring to FIGS. 2(1) and (2), the 3D cube filter 70 consists of 3×3×3 cells. The 3D cube filter may be expressed by $\{X_{min}, X_{max}, Y_{min}, Y_{max}, Z_{min}, Z_{max}, C_s\}$. Here, the preceding six parameters denote six outer points 71 to 76 of a center cell as shown in the following expression, and the last parameter denotes a length of one side in a cube filter.

$$X_{min} = \text{mean}_i \min_j X_i^j$$

$$X_{max} = \text{mean}_i \max_j X_i^j$$

$$Y_{min} = \text{mean}_i \min_j Y_i^j$$

$$Y_{max} = \text{mean}_i \max_j Y_i^j$$

$$Z_{min} = \text{mean}_i \min_j Z_i^j$$

$$Z_{max} = \text{mean}_i \max_j Z_i^j \qquad \text{Expression 1}$$

The cube filter is obtained from $\{S_1, S_2, \ldots, S_n\}$ that are previously obtained n pieces of data, and each piece of the data is represented by $S_i = \{(X_i^1, Y_i^1, Z_i^1), \ldots, (X_i^M, Y_i^M, Z_i^M)\}$.

2) Data Normalization

Figure 3:
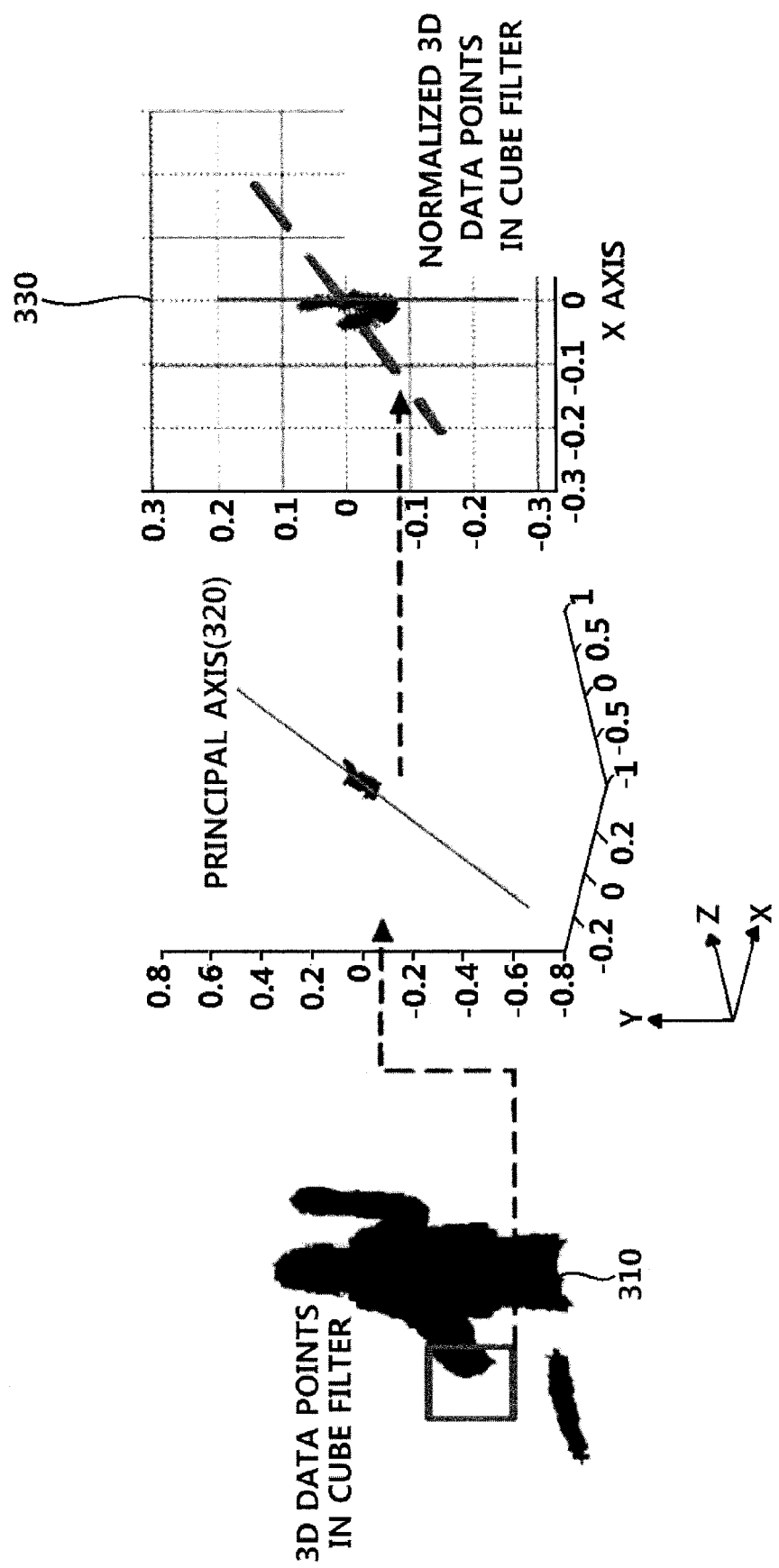
FIG. 3 is a conceptual diagram illustrating a data normalizing process according to an example embodiment of the present invention.

FIG. 3 is a conceptual diagram illustrating a data normalizing process according to an example embodiment of the present invention.

Referring to FIG. 3, the normalization of 3D data uses 3D connected components 310 and axis rotational movement using the Y-axis as a principal axis 320. It is assumed that the 3D data points 310 are represented by $P = \{p_i = (x_i, y_i, z_i)\}$, and an area 330 of a cube having $\{x_c, y_c, z_c\}$ as a center is represented by $P_h$. First, noise data in the $P_h$ is removed using the 3D connected components, and the rotational movement is then performed on remaining data using the Y-axis as the principal axis. The principal axis 320 $n = \{n_x, n_y, n_z\}^T$ is extracted using principal component analysis (PCA). In this case, the rotational movement may be represented by the following expression.

$$\begin{bmatrix} x_i^t \\ y_i^t \\ z_i^t \end{bmatrix} = \begin{bmatrix} x_i \\ y_i \\ z_i \end{bmatrix} - \begin{bmatrix} x_c \\ y_c \\ z_c \end{bmatrix} \qquad \text{Expression 2}$$

-continued $$\begin{bmatrix} x_i^r \\ y_i^r \\ z_i^r \end{bmatrix} = \begin{bmatrix} \cos\Phi & -\sin\Phi & 0 \\ \sin\Phi & \cos\Phi & 0 \\ 0 & 0 & 1 \end{bmatrix} \begin{bmatrix} 1 & 0 & 0 \\ 0 & \cos\Theta & -\sin\Theta \\ 0 & \sin\Theta & \cos\Theta \end{bmatrix} \begin{bmatrix} x_i^t \\ y_i^t \\ z_i^t \end{bmatrix}$$

Here, and are obtained by $$\Theta = \arctan\left(\frac{n_3}{n_1}\right) \text{ and } \Phi = \arctan\left(\frac{n_1}{n_2}\right),$$

respectively.

3) Expression of Volumetric Feature Vector

Figure 4:
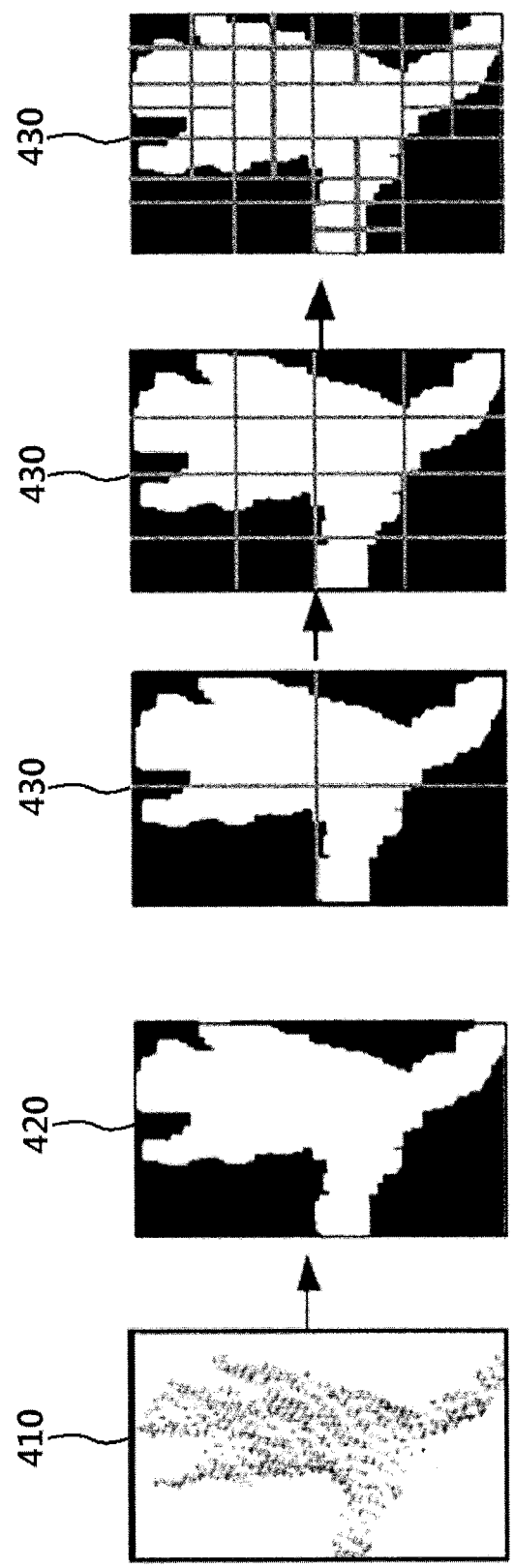
FIG. 4 is a conceptual diagram illustrating an example of applying a quad-tree algorithm to data projected onto one cell according to an example embodiment of the present invention.

FIG. 4 is a conceptual diagram illustrating an example of applying a quad-tree algorithm to data projected onto one cell according to an example embodiment of the present invention.

The volumes of the 27 cells of the 3D cube filter are obtained and expressed as one vector, which is the volumetric feature vector.

Referring to FIG. 4, 3D data 410 is first assigned to one cell. Then, a binary image 420 is made by projecting the data 410 assigned to the cell onto an X-Y plane. In this case, a dilation operation may be used to fill empty spaces of the projected data.

Then, the corresponding binary image 420 is divided into several split leaf nodes 430. For example, a j-th leaf node of an i-th cell may be represented by $L_i^j = \{area_i^j, \overline{Z}_i^j, \underline{Z}_i^j\}$. The volume of each of the cells is obtained by the following expression.

$$V_i = \sum_j area_i^j \times (\overline{Z}_i^j - \underline{Z}_i^j) \qquad \text{Expression 3}$$

Finally, the volumetric feature vector x may be represented as follows.

$$x = [V_1, V_2, \ldots, V_{27}]$$

4) Two-Step Object Detection

Figure 5:
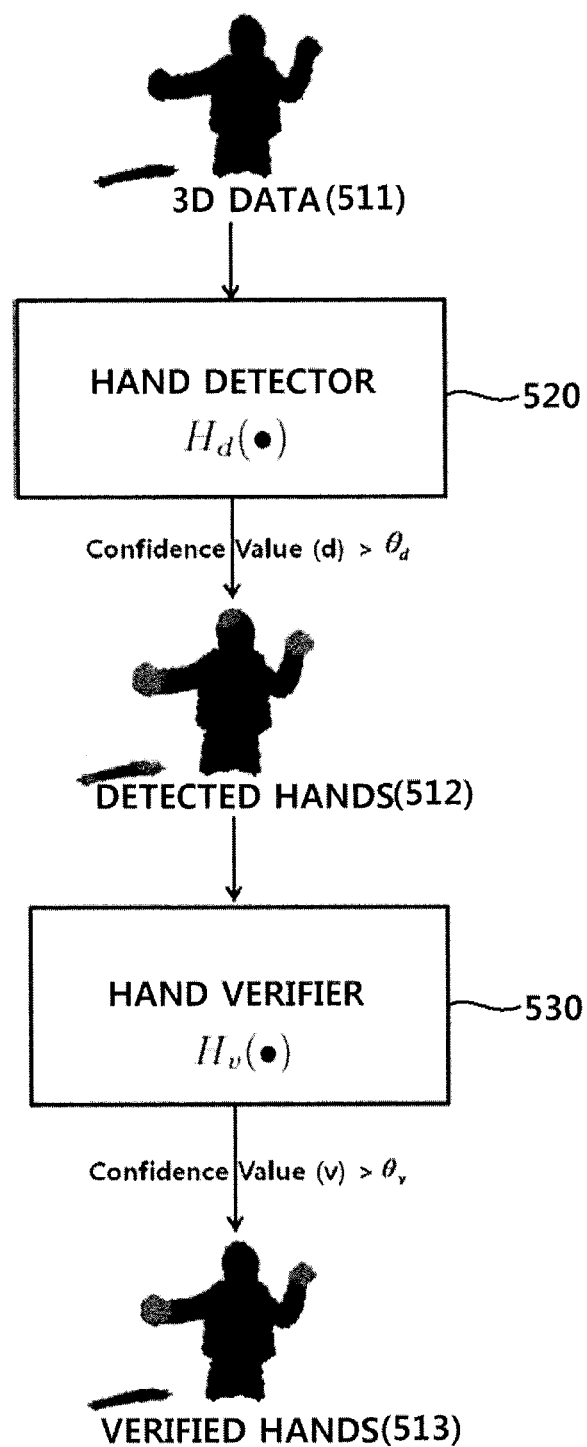
FIG. 5 is a conceptual diagram illustrating a two-step detection process according to an example embodiment of the present invention.

FIG. 5 is a conceptual diagram illustrating a two-step detection process according to an example embodiment of the present invention.

Referring to FIG. 5, a specific object detection step including two steps may be used for reliable detection. Hand detection will be described as an example below.

In the specific object detection step, a hand detector 520 and a hand verifier 530 are used. Here, the hand detector 520 has a 3D Haar-like filter with high recall, and the hand verifier 530 has a 3D Haar-like filter with high accuracy.

The hand detector 520 includes an error but detects all candidates 512 that are considered as a hand. The hand verifier 530 selects only data 513 of the hand among the candidates 512 obtained through the hand detector 520. The hand detector 520 may be a detector trained with data including the wrist, and the hand verifier 530 may be a verifier trained with data including the wrist and elbow.

The detection result obtained through the hand detector 520 and the hand verifier 530 may be obtained by the following expression.

$$H(x) = \begin{cases} 1, & \text{if } H_d(x) > \theta_d \text{ AND } H_v(x_d) > \theta_v \\ -1, & \text{otherwise} \end{cases} \quad \text{Expression 4}$$

Here, x and $x_d$ denote hand data 512 detected through an input 3D data 511 and the hand detector 520, respectively. $H_d(x)$ and $H_y(x_d)$ denote the hand detector 520 and the hand verifier 530, respectively. $\theta_d$ and $\theta_v$ denote thresholds of the hand detector 520 and the hand verifier 530, respectively.

5) Generation of 3D Haar-Like Filter

Figure 6:
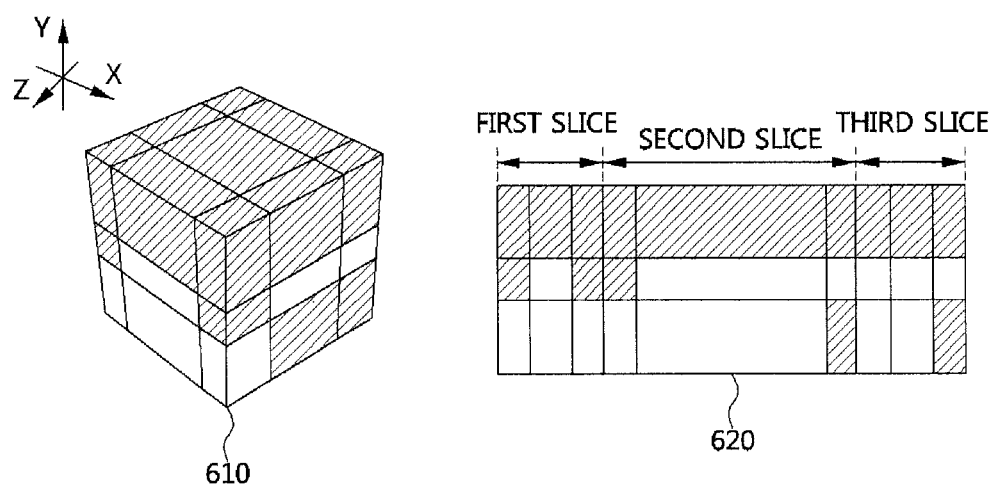
FIG. 6 is a conceptual diagram illustrating a 3D Haar-like filter according to an example embodiment of the present invention.

FIG. 6 illustrates a 3D Haar-like filter 610 and an example 620 obtained by unfolding the 3D Haar-like filter on a 2D plane according to an example embodiment of the present invention.

Referring to FIG. 6, the 3D Haar-like filter is expressed as a combination of a cube filter and a Haar-like filter. Each cell of the cube filter has +1 or −1, and thus can be expressed in $2^{27}$ different forms.

Figure 7:
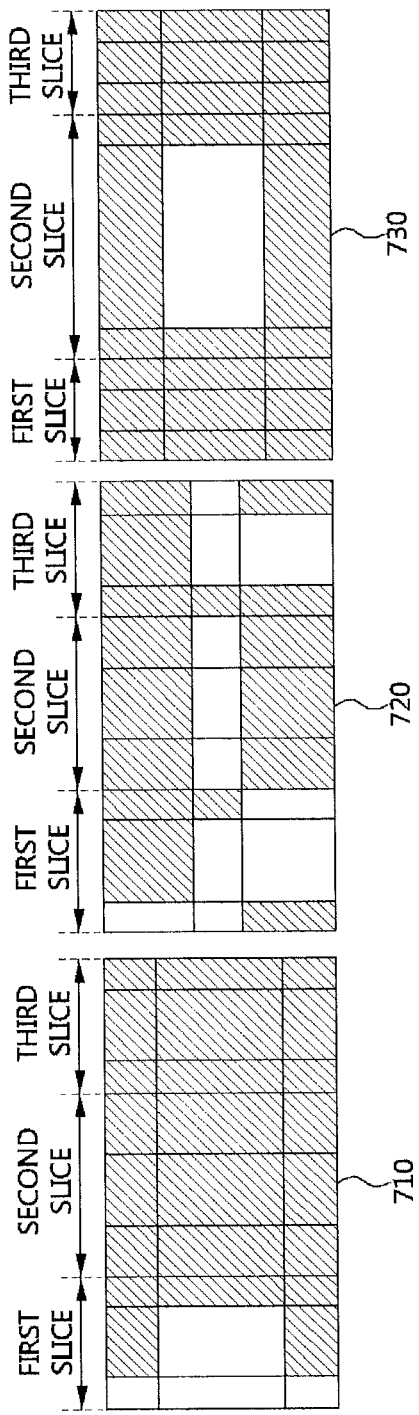
FIG. 7 is a conceptual diagram illustrating a weak classifier most suitable for detecting a specific object, which is selected by an Adaboost algorithm according to an example embodiment of the present invention.

FIG. 7 is a conceptual diagram illustrating a weak classifier most suitable for hand detection, which is selected by an Adaboost algorithm according to an example embodiment of the present invention.

Referring to FIG. 7, it can be seen that three 3D Haar-like filters 710 to 730 are selected using Adaboost training so as to select a weak classifier suitable for hand detection from a plurality of 3D Haar-like filters.

One weak classifier is one 3D Haar-like filter, and may be represented by the following expression.

$$h_{i,j}(x) = \begin{cases} 1, & \text{if } x^T \cdot b_j > \theta_{i,j} \\ -1, & \text{otherwise} \end{cases} \quad \text{Expression 5}$$

Here, x denotes a volumetric feature vector, $b_j$ denotes 27D binary vector of a j-th Haar-like filter, and θi,j denotes a threshold of an i-th Haar-like filter.

The hand detection using the volumetric feature vector and the 3D Haar-like filter, proposed according to the example embodiment of the present invention, obtained average performance of 98.25%. A cube having a size of 45 cm showed the most preferable performance, and was more stable than other sizes. The detection performance of the proposed volumetric feature vector was superior by about 20% or more to that of other features. As a result, the performance of the proposed hand detection algorithm was improved by about 20% or more compared to that of the conventional hand detection algorithm.

Training Method and Apparatus for Detecting Object in 3D Image

Figure 8:
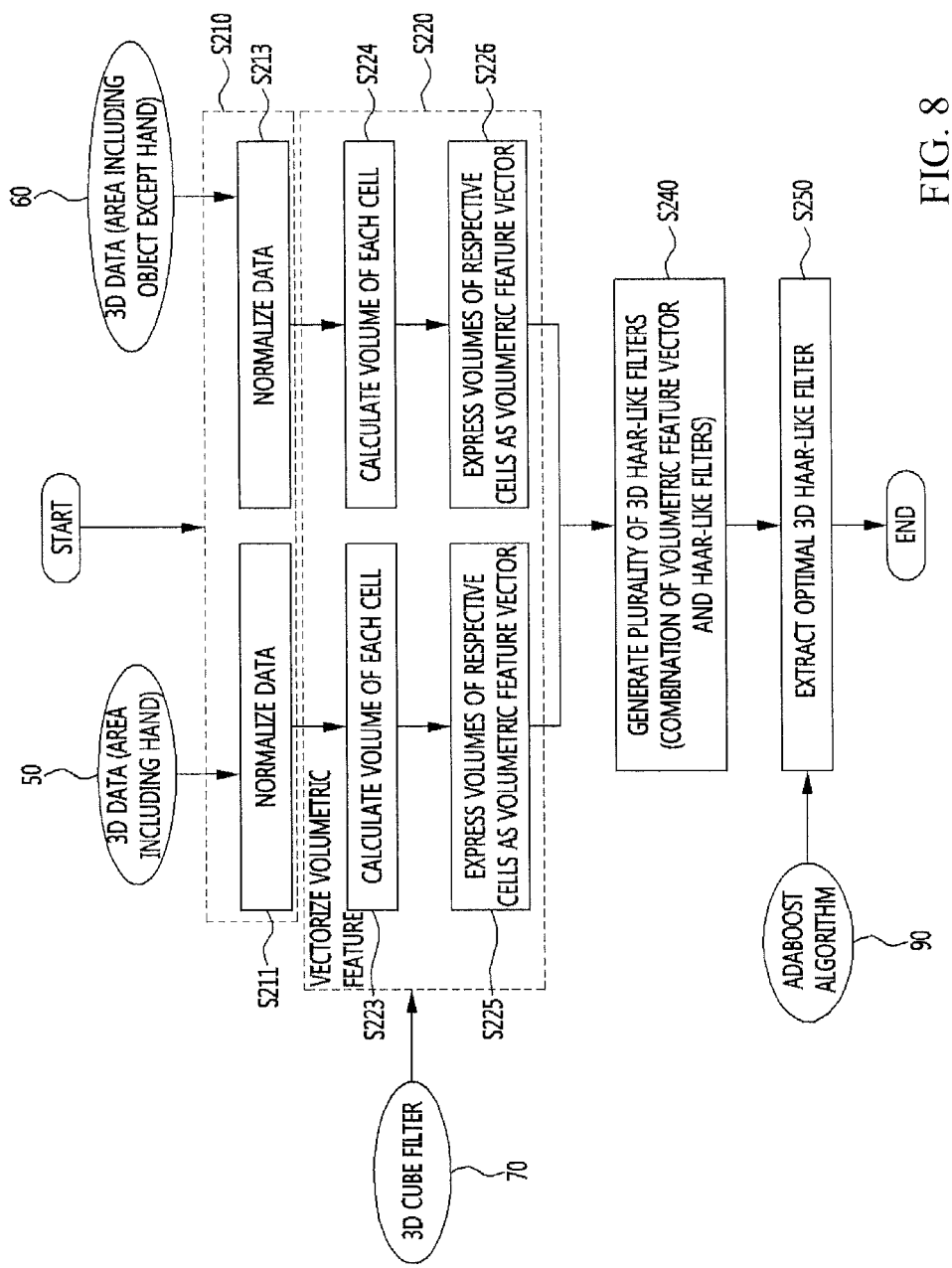
FIG. 8 is a sequence chart illustrating steps in a process of training data for detecting an object according to an example embodiment of the present invention.

FIG. 8 is a sequence chart illustrating steps in a process of training data for detecting an object according to an example embodiment of the present invention.

Referring to FIG. 8, the steps in the process of training data for detecting an object in an image according to the example embodiment of the present invention include a data normalization step (S210), a volumetric feature vectorization step (S220), a 3D Haar-like filter generation step (S240) and an optimal 3D Haar-like filter extraction step (S250).

The steps in the process of training data for detecting an object in an image according to the example embodiment of the present invention may be described as follows. Detailed descriptions of parts previously described in the aforementioned hand detection process will be omitted.

Hand detection will be described below as an example. In the process of training data for hand detection, two kinds of data, i.e., an area including a hand and an area including an object except the hand are used.

The data normalization step (S210) may be divided into a step (S211) of extracting data of the area including the hand from data of a multi-dimensional image and normalizing the extracted data in a previously defined specific form, and a step (S213) of extracting data of the area including the object except the hand and normalizing the extracted data in a previously defined specific form. The normalized data obtained in each of the steps (S211 and S213) is used as an input in the next step.

The volumetric feature vectorization step S220 includes a step (S223) of calculating the volume of each cell in each 3D cube filter and a volumetric feature vector expression step (S225).

The step (S223) of calculating the volume of each cell is a step of generating a 3D cube filter, assigning the corresponding part of the normalized data to each of the cells in the 3D cube filter, and calculating a volume of the assigned cell in the 3D cube filter. The step may be individually performed on data of the area including the hand and data of the area including the object except the hand (S223 and S224).

In the volumetric feature vector expression step (S225), one volumetric feature vector having a volumetric feature is expressed using the volumes of the cells in the 3D cube filter. The step may also be individually performed on cells to which data of the area including the hand is assigned and cells to which data of the area including the object except the hand is assigned (S225 and S226).

In the 3D Haar-like filter generation step (S240), a plurality of 3D Haar-like filters are generated by combining the volumetric feature vector and Haar-like filters. The step may be performed by receiving, as inputs, volumetric feature vectors for the area including the hand and the area including the object except the hand.

The optimal 3D Haar-like filter extraction step (S250) is a step of extracting a 3D Haar-like filter suitable for hand detection, that is, satisfying a predetermined confidence value, from the plurality of 3D Haar-like filters generated in the previous step using an Adaboost algorithm. The 3D Haar-like filter extracted in the step may be used as a classifier later to detect a hand in an image.

A configuration of a training apparatus for detecting a specific object according to an example embodiment of the present invention will be described below.

Figure 9:
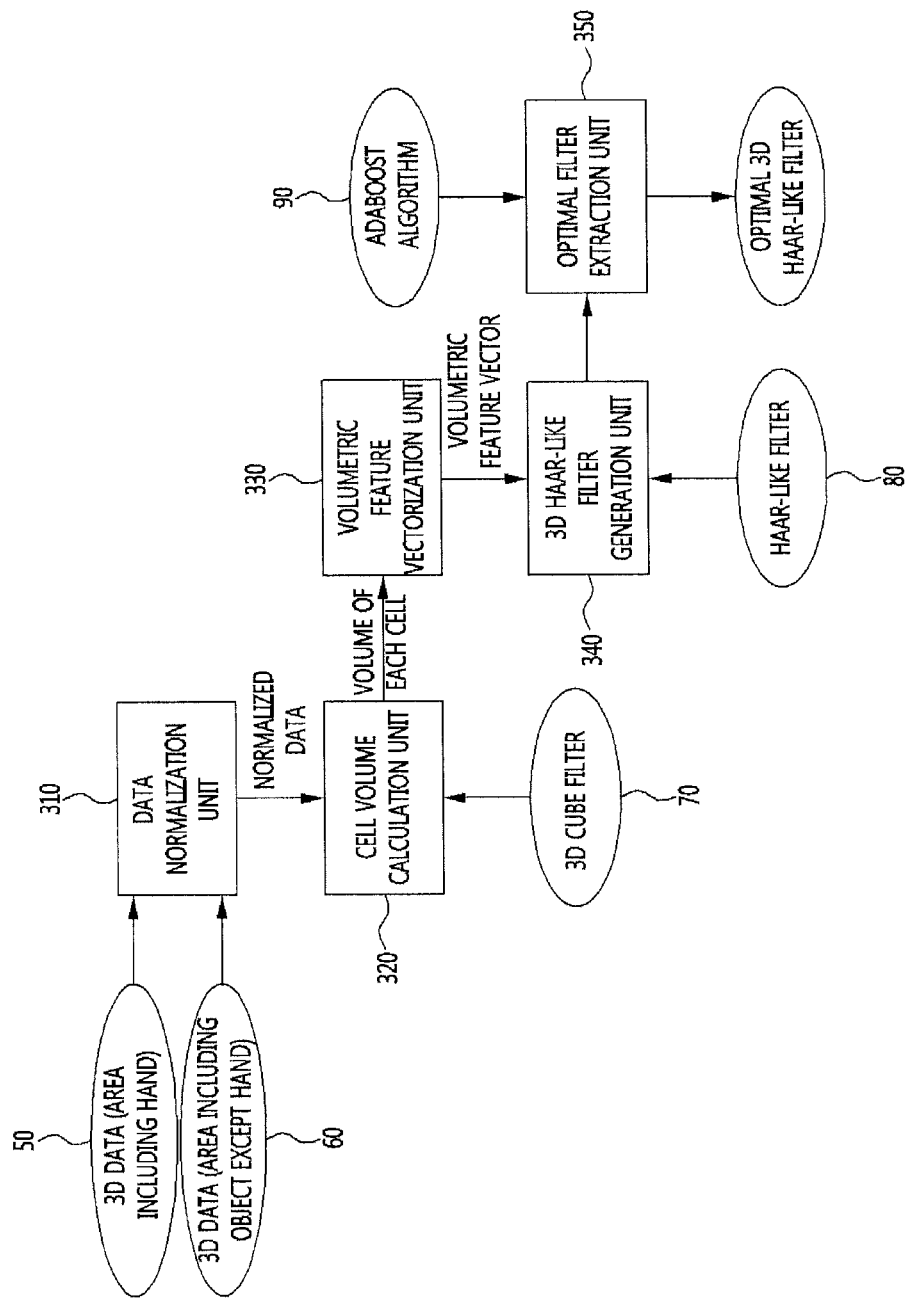
FIG. 9 is a conceptual diagram illustrating a configuration of a training apparatus for detecting an object according to an example embodiment of the present invention.

FIG. 9 is a conceptual diagram illustrating a configuration of a training apparatus for detecting an object according to an example embodiment of the present invention.

Referring to FIG. 9, the training apparatus for detecting a specific object according to the example embodiment of the present invention includes a data normalization unit 310, a cell volume calculation unit 320, a volumetric feature vectorization unit 330, a 3D Haar-like filter generation unit 340 and an optimal filter extraction unit 350. One or more of the units (310, 320, 330, 340, 350) execute on a computer processor.

The training apparatus for detecting a specific object according to the example embodiment of the present invention may be described as follows.

The data normalization unit 310 is a unit for extracting data of an area including a specific object and an area including an object except the specific object from data of a multi-dimensional image and normalizing the extracted data in a previously defined specific form. The object except the specific object may be determined from an object having a position related to that of the specific object to be detected.

For example, to detect a hand, data of an area 50 including the hand and an area 60 including an object except the hand may be extracted and then normalized.

The cell volume calculation unit 320 is a unit for generating a 3D cube filter 70, assigning the corresponding part of the normalized data to each of the cells in the 3D cube filter, and then calculating a volume of each of the cells.

The volumetric feature vectorization unit 330 is a unit for expressing volumes of the cells as one volumetric feature vector. After the corresponding part of the normalized data is assigned to each of the cells in the 3D cube filter, a binary image is generated by projecting the part of the data corresponding to each of the cells onto an X-Y plane, and the volume of each of the cells is calculated by dividing the binary image of each of the cells into a plurality of split leaf nodes. The volumetric feature vector may be expressed using the volumes of the cells.

The 3D Haar-like filter generation unit 340 is a unit for generating a plurality of 3D Haar-like filters by combining the volumetric feature vector and Haar-like filters.

The optimal filter extraction unit 350 is a unit for extracting a 3D Haar-like filter suitable for hand detection, that is, satisfying a predetermined confidence value, from the plurality of 3D Haar-like filters generated in the previous step using an Adaboost algorithm.

As described above, in a method and apparatus for detecting an object using a volumetric feature vector and 3D Haar-like filters according to the example embodiments of the present invention, a 3D volumetric feature vector of an image is extracted using a 3D cube filter, 3D Haar-like filters are generated by combining the volumetric feature vector and Haar-like filters, and an optimal filter is selected using an Adaboost algorithm, so that an object, particularly a hand can be more exactly detected.

While the example embodiments of the present invention and their advantages have been described in detail, it should be understood that various changes, substitutions and alterations may be made herein without departing from the scope of the invention.

What is claimed is:

1. A method of detecting a specific object using a multi-dimensional image including the specific object implemented by an apparatus for detecting a specific object in an image, the method comprising:
    with respect to each window slide of the image subjected to window sliding by applying a previously generated 3D cube filter,
    normalizing, by the apparatus, data of an area corresponding to the window sliding in a previously defined specific form;
    assigning, by the apparatus, a corresponding part of the normalized data to each cell in the 3D cube filter and then calculating a volume of each of the cells, thereby expressing the volumes of the cells as one volumetric feature vector having a volumetric feature; and
    applying, by the apparatus, the volumetric feature vector to a classifier so as to decide whether or not the data of the area corresponding to the window slide corresponds to the specific object.

2. The method of claim 1, wherein the image is a 3D image obtained using a 3D camera, and the specific object is a hand.

3. The method of claim 1, wherein the data of the area corresponding to the window slide is 3D data, and the 3D data is normalized using 3D connected components and axis rotational movement using a Y-axis as a principal axis.

4. The method of claim 1, wherein expressing the volumes of the cells as the volumetric feature vector includes:
    assigning the corresponding part of the normalized data to each of the cells in the 3D cube filter and then projecting the part of the data corresponding to the cell onto an X-Y plane, thereby generating a binary image;
    dividing the binary image of each of the cells into a plurality of split leaf nodes, thereby calculating a volume of the cell; and
    expressing the calculated volumes of the cells as the one volumetric feature vector.

5. The method of claim 4, wherein the binary image is generated using a dilation operation so as to fill empty spaces of the projected parts of the data.

6. The method of claim 4, wherein the binary image is divided into a plurality of split leaf nodes using a quad tree algorithm.

7. The method of claim 1, wherein the classifier is a classifier generated using the volumetric feature based on the 3D cube filter and Haar-like filters.

8. The method of claim 1, wherein applying the volumetric feature vector to the classifier includes:
    obtaining a first classification result by applying the volumetric feature vector to a first classifier; and
    obtaining a second classification result by applying the first classification result to a second classifier,
    wherein the first classifier is a classifier trained with the specific object and a first object, the second classifier is a classifier trained with the specific object, the first object and a second object, and the first and second objects are different objects determined from objects except the specific object.

9. A training method for detecting a specific object using a multi-dimensional image including the specific object implemented by an apparatus for detecting a specific object in an image, the training method comprising:
    extracting, by the apparatus, data of an area including the specific object from data of the multi-dimensional image and primarily normalizing the extracted data in a previously defined specific form;
    generating, by the apparatus, a 3D cube filter, assigning a corresponding part of the normalized data to each cell in the 3D cube filter and then calculating a volume of each of the cells, thereby expressing the volumes of the cells as a first volumetric feature vector; and
    generating, by the apparatus, a plurality of 3D Haar-like filters by combining the first volumetric feature vector and Haar-like filters.

10. The training method of claim 9, further comprising:
    extracting data of an area including an object except the specific object and secondarily normalizing the extracted data in a previously defined specific form;
    assigning a corresponding part of the secondarily normalized data to each of the cells in the 3D cube filter and then calculating a volume of the cell, thereby expressing the volumes of the cells as a second volumetric feature vector; and
    generating a plurality of 3D Haar-like filters by combining the second volumetric feature vector and Haar-like filters,
    wherein the multi-dimensional image further includes the object except the specific object.

11. The training method of claim 10, wherein the multi-functional image is a 3D image, the data of an area including an object except the specific object data and the data of an area including the specific object are 3D data, and the 3D data is normalized using 3D connected components and axis rotational movement using a Y-axis as a principal axis.

12. The training method of claim 9 or 10, wherein, after the corresponding part of the normalized data is assigned to each of the cells in the 3D cube filter, a binary image is generated by projecting the part of the data corresponding to the cell onto an X-Y plane, the volume of the cell is calculated by dividing the binary image of the cell into a plurality of split leaf nodes, and then the first or second volumetric feature vector is expressed using the volumes of the cells.

13. The training method of claim 9 or 10, further comprising extracting a 3D Haar-like filter satisfying a predetermined confidence value from the plurality of 3D Haar-like filters using a predetermined training algorithm.

14. The training method of claim 13, wherein the predetermined training algorithm is an Adaboost algorithm, and the specific object is a hand.

* * * * *